(12) United States Patent
Birsching et al.

(10) Patent No.: US 10,703,408 B2
(45) Date of Patent: Jul. 7, 2020

(54) STEERING SYSTEM HAVING A PRESSURE SENSOR

(71) Applicant: Steering Solutions IP Holding Corporation, Saginaw, MI (US)

(72) Inventors: Joel E. Birsching, Vassar, MI (US); Martin P. Sheridan, Midland, MI (US); John T. Sigelko, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/458,964

(22) Filed: Jul. 1, 2019

(65) Prior Publication Data

US 2019/0322315 A1    Oct. 24, 2019

Related U.S. Application Data

(63) Continuation-in-part of application No. 15/440,557, filed on Feb. 23, 2017, now Pat. No. 10,421,485.

(60) Provisional application No. 62/299,171, filed on Feb. 24, 2016.

(51) Int. Cl.
*B62D 6/10* (2006.01)
*B62D 5/04* (2006.01)
*B62D 5/06* (2006.01)

(52) U.S. Cl.
CPC .............. *B62D 6/10* (2013.01); *B62D 5/0463* (2013.01); *B62D 5/062* (2013.01)

(58) Field of Classification Search
CPC ......... B62D 6/10; B62D 5/0463; B62D 5/062
USPC ......................................................... 180/422
See application file for complete search history.

(56) References Cited

U.S. PATENT DOCUMENTS

| 6,448,728 | B2* | 9/2002 | Noro | B62D 5/0463 180/443 |
| 2003/0055546 | A1* | 3/2003 | Demerly | B62D 5/001 701/42 |
| 2006/0196722 | A1* | 9/2006 | Makabe | B62D 5/0481 180/443 |
| 2006/0208564 | A1* | 9/2006 | Yuda | B60T 8/1755 303/146 |
| 2015/0175199 | A1* | 6/2015 | Kuramochi | B62D 6/10 701/41 |
| 2015/0353128 | A1* | 12/2015 | Shibuya | B60W 10/02 701/41 |
| 2016/0121924 | A1* | 5/2016 | Norstad | B62D 5/0406 701/42 |
| 2017/0166249 | A1* | 6/2017 | Birsching | B62D 5/065 |
| 2017/0240168 | A1* | 8/2017 | Sasaki | B60W 10/18 |
| 2018/0215409 | A1* | 8/2018 | Pramod | B62D 5/049 |

* cited by examiner

*Primary Examiner* — Jacob D Knutson
(74) *Attorney, Agent, or Firm* — Dickinson Wright PLLC

(57) ABSTRACT

A method of assisting a steering effort in a hydraulic steering system is provided. The method includes measuring a pressure with a pressure sensor assembly. The method also includes calculating an input torque with a controller. The method further includes measuring at least one vehicle condition with at least one vehicle sensor and sending a vehicle condition signal to the controller. The method yet further includes determining a current required to operate an actuator with the controller.

15 Claims, 5 Drawing Sheets

STEERING SYSTEM HAVING A PRESSURE SENSOR

CROSS-REFERENCES TO RELATED APPLICATIONS

This patent application is a Continuation-in-Part of U.S. patent application Ser. No. 15/440,557, filed Feb. 23, 2017, which claims priority to U.S. Provisional Patent Application Ser. No. 62/299,171, filed Feb. 24, 2016, both of which are incorporated herein by reference in their entirety.

BACKGROUND OF THE INVENTION

The present disclosure relates to a steering system having a pressure sensor.

Hydraulic power steering systems use a power steering pump to provide pressurized hydraulic fluid to a steering gear. The level of assist provided by the hydraulic power steering system is determined by the amount of torque applied by the driver to a steering valve integrated into the steering gear.

SUMMARY OF THE INVENTION

According to one aspect of the disclosure, a method of assisting a steering effort in a hydraulic steering system is provided. The method includes measuring a pressure with a pressure sensor assembly. The method also includes calculating an input torque with a controller. The method further includes measuring at least one vehicle condition with at least one vehicle sensor and sending a vehicle condition signal to the controller. The method yet further includes determining a current required to operate an actuator with the controller.

According to another aspect of the disclosure, a method of assisting a steering effort in a hydraulic steering system is provided. The method includes measuring a pressure with a pressure sensor assembly. The method also includes measuring at least one vehicle condition with at least one vehicle sensor and sending a vehicle condition signal to a controller. The method further includes measuring a driver torque with a torque sensor and sending the data as a signal to the controller. The method yet further includes determining a current required to operate an actuator of an electric steering assist assembly with the controller.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
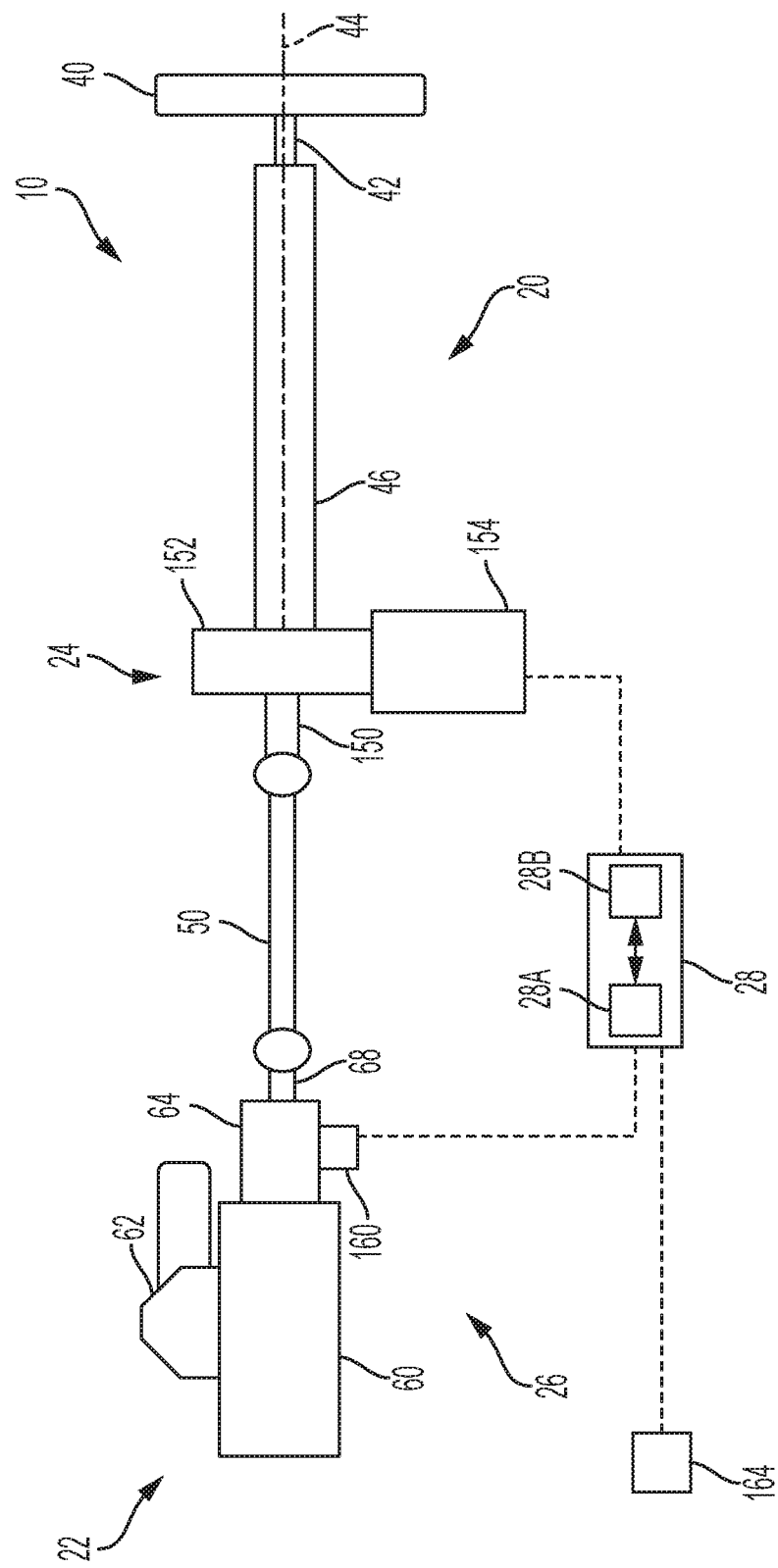
FIG. 1 is a perspective view of a power steering system having a pressure sensor.
Figure 2:
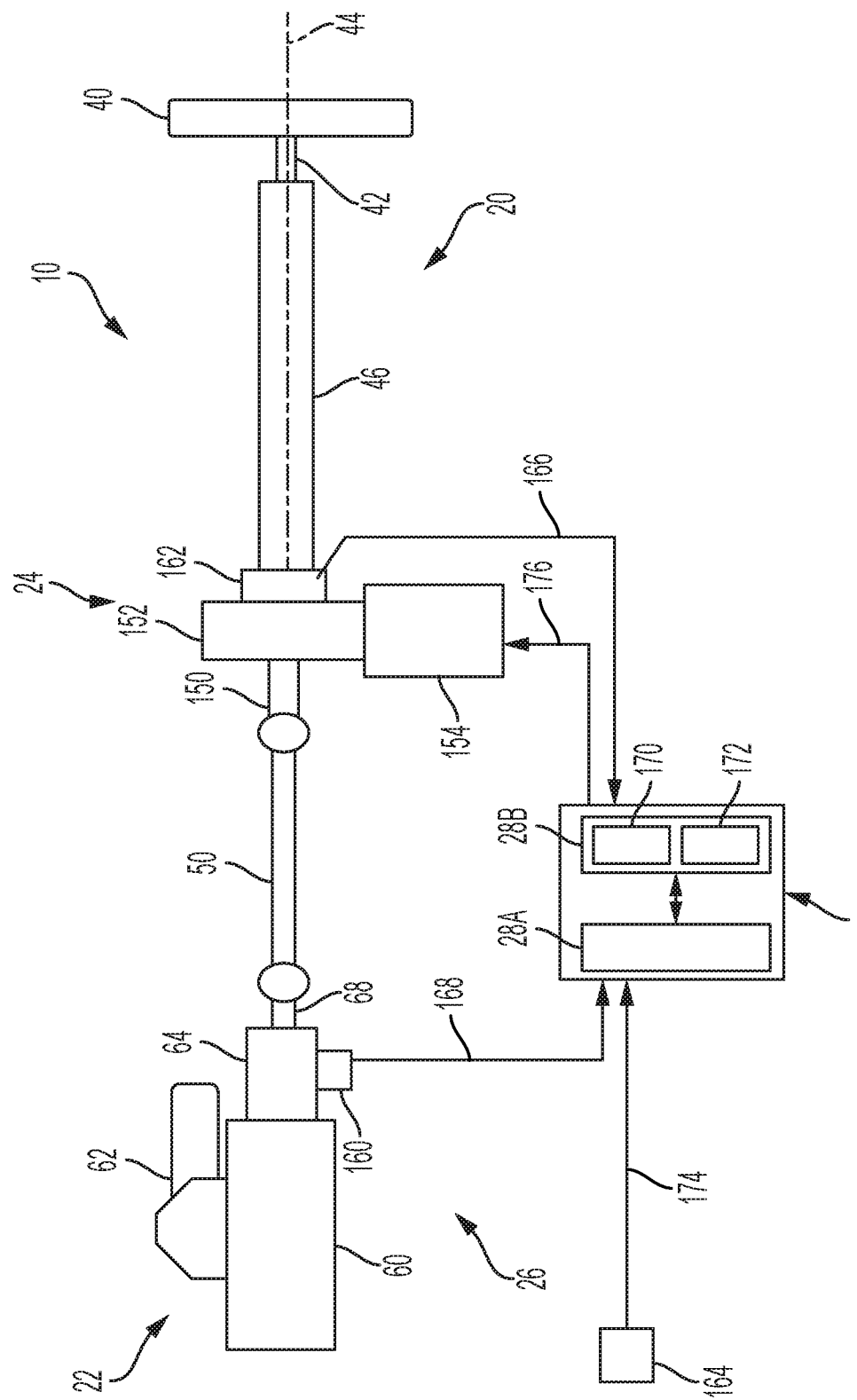
FIG. 2 is a perspective view of a power steering system having a pressure sensor and a torque sensor.

Referring to FIGS. 1 and 2, a power steering system 10 is shown. The power steering system 10 may be configured as a hydraulic power steering system having an electric power steering assist system. The electric power steering assist system, in conjunction with the hydraulic power steering system, provides the ability to implement advanced features such as active damping, active returnability, pull compensation, lane keeping, steering feedback, and park assist. These advanced features and standard operating of the power steering system 10 may require coordination between the hydraulic power steering system and the electric power steering assist system.

The power steering system 10 includes a steering column assembly 20, a steering gear assembly 22, a steering assist assembly 24, a sensor assembly 26, and a controller 28.

The steering column assembly 20 includes a steering wheel 40 operatively connected to a steering shaft 42. The steering shaft 42 extends along a steering column axis 44 through a steering column 46.

The steering gear assembly 22 is operatively connected to the steering shaft 42 through an intermediate shaft 50. The steering gear assembly 22 is a hydraulic mechanism that is operatively connected to a hydraulic power steering pump that is configured to provide pressurized hydraulic fluid to the steering gear assembly 22. The amount of pressurized hydraulic fluid varies the level of assist provided by the steering gear assembly 22, at least partially determined by the amount of torque applied by a driver of a vehicle to the steering shaft 42; and in the embodiment shown, the torque applied to the steering shaft 42 through the steering wheel 40.

Figure 3:
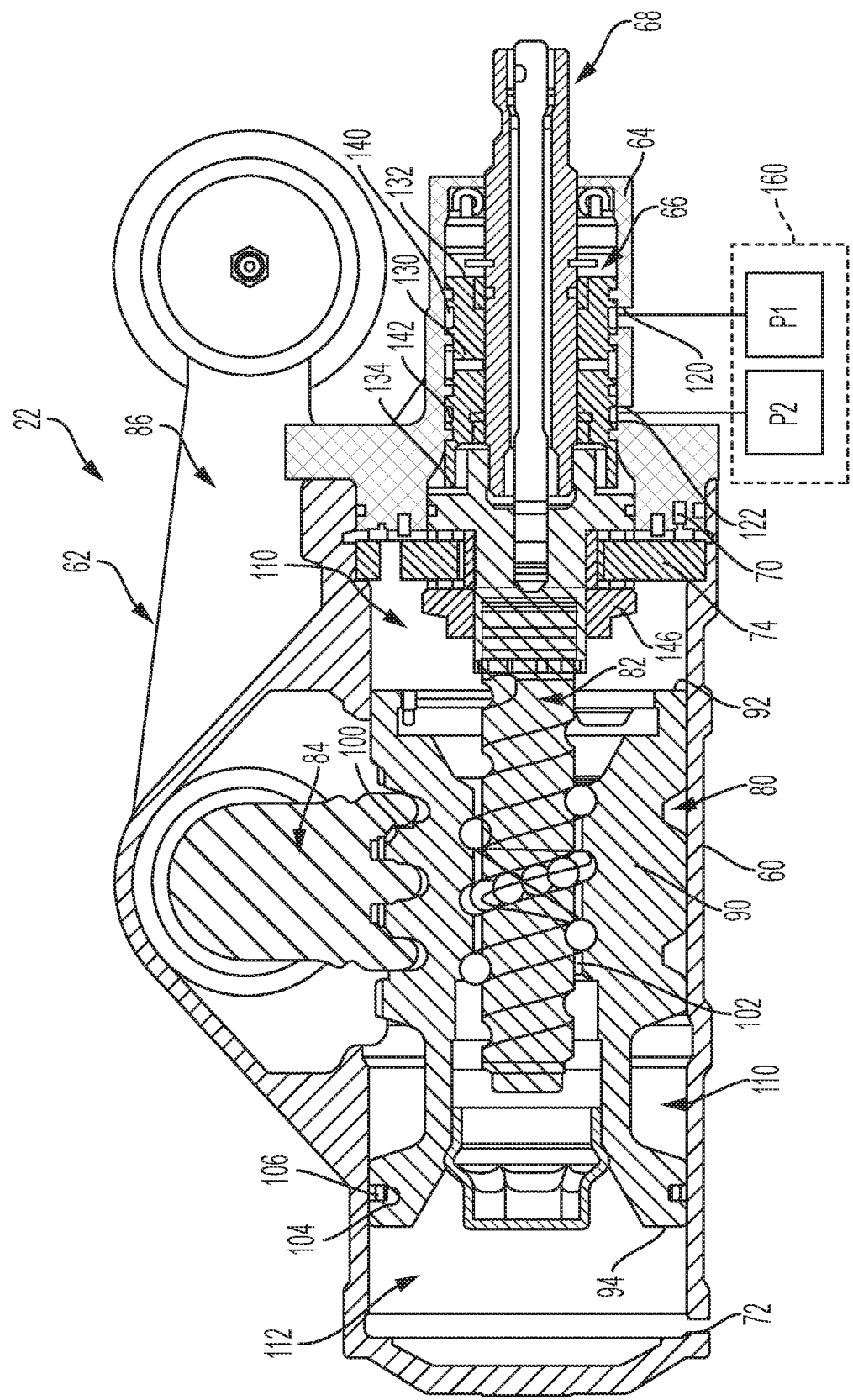
FIG. 3 is a cross-sectional view of a steering gear assembly of the power steering system of FIGS. 1 and 2.

Referring to FIGS. 1-3, the steering gear assembly 22 includes a rack housing 60, a steering rack assembly 62, a valve housing 64, a valve assembly 66 (see FIG. 3), and an input shaft 68.

Referring to FIG. 3, the rack housing 60 extends from the valve housing 64. In at least one embodiment, the rack housing 60 defines a first port 70 and a second port 72. In at least one other embodiment, the valve housing 64 defines the first port 70 and the rack housing defines the second port 72. The first port 70 further extends through an opening formed in a bulkhead 74 that is disposed between the valve housing 64 and the steering rack assembly 62. The bulkhead 74 extends into the rack housing 60.

The rack housing 60 is configured to receive at least a portion of the steering rack assembly 62. The steering rack assembly 62 includes a rack 80, a rotary member 82, a Pitman shaft 84, and a Pitman arm 86.

The rack 80 is disposed within the rack housing 60. The rack 80 includes a rack body 90 that extends between a first rack end 92 and the second rack end 94. The first rack end 92 is disposed proximate and faces towards the valve assembly 66. The second rack end 94 is disposed opposite the first rack end 92 and faces towards an end of the rack housing 60.

The rack body 90 defines a plurality of teeth or protrusions 100 that extend towards an interior surface of the rack housing 60. The rack body 90 defines a rack bore 102 that extends from the first rack end 92 to the second rack end 94, and may communicate there-through. The rack body 90 defines a helical ball groove located radially outward from, and in direct communication with the rack bore 102.

The rack body 90 further defines a rack groove 104 that extends about an outer periphery of the rack body 90 proximate the second rack end. A rack ring 106 is received within the rack groove 104.

The rack housing 60 and the rack 80 define a first cavity 110 and a second cavity 112. The first cavity 110 is disposed proximate the first rack end 92, the rack housing 60, and at least a portion of the valve assembly 66. In at least one embodiment, the first cavity 110 is disposed between the rack ring 106 and the second rack end 94 of the rack body 90. The first port 70 is defined proximate, and is fluidly connected to, the first cavity 110. The second cavity 112 is defined proximate the rack ring 106 and the end of the rack housing 60. The second port 72 is defined proximate, and is fluidly connected to, the second cavity 112.

The rotary member 82 extends into the rack bore 102 of the rack body 90 of the rack 80 and extends into the valve housing 64. The rotary member 82 is attached to the input shaft 68. The rotary member 82 provides a thrust force on the rack 80 to translate the rack 80 along or relative to the rotary member 82. The rotary member 82 may be configured as a worm.

As the rotary member 82 is rotated, the valve assembly 66 provides assist pressure to either the first cavity 110 or the second cavity 112 depending on the direction of the torque to assist in steering the vehicle. For example, should the assist pressure be provided to the first cavity 110, the rack 80 moves towards the end of the rack housing 60. Should the assist pressure be provided to the second cavity 112, the rack 80 moves towards the valve assembly 66. The teeth or protrusions 100 of the rack body 90 of the rack 80 mate or engage with teeth of the Pitman shaft 84. As the rack 80 translates along or relative to the rotary member 82, the Pitman shaft 84 rotates along or about its axis. The Pitman shaft 84 is operatively connected to the Pitman arm 86 that is connected to a steering linkage of the vehicle. As the Pitman shaft 84 rotates, the Pitman arm 86 swings or moves along an arc to move the steering linkage of the vehicle resulting in angulation of a steerable wheel of the vehicle to steer the vehicle.

The valve housing 64 is operatively connected to the rack housing 60. In at least one embodiment, the valve housing 64 defines a first port 120 and a second port 122. The valve housing 64 receives the valve assembly 66 and the input shaft 68.

The valve assembly 66 includes a valve body 130 that extends between a first valve body and 132 and a second valve body and 134. The second valve body end 134 is disposed opposite the first valve body end 132 and faces towards the steering rack assembly 62. The valve body 130 is disposed within the valve housing 64 and is disposed about the input shaft 68.

The valve body 130 defines a first annular groove 140 and a second annular groove 142. The first annular groove 140 is fluidly connected to the first cavity 110. The first port 120 is disposed proximate and is fluidly connected to the first annular groove 140. The second annular groove 142 is fluidly connected to the second cavity 112. The second port 122 is disposed proximate and is fluidly connected to the second annular groove 142. Each of the first annular groove 140 and the second annular groove 142 are disposed between, and defined by, the valve housing 64 and the valve body 130.

Referring to FIGS. 1-3, the input shaft 68 extends at least partially through the valve housing 64 and the valve assembly 66. At least a portion of the input shaft 68 is operatively connected to a portion of the rotary member 82 that extends into the valve housing 64 and also into the rack 80 through a coupling member 146, such as a spanner nut. A portion of the input shaft 68 extends from the valve housing 64 towards the steering shaft 42. The input shaft 68 is operatively connected to the steering shaft 42 via the intermediate shaft 50. The input shaft 68 includes a torsion bar that transmits torque between the input shaft 68 and the rotary member 82. The torsion bar enables the input shaft 68 to rotate relative to the rotary member 82.

Referring to FIGS. 1 and 2, the steering assist assembly 24 is disposed between the steering column assembly 20 and the steering gear assembly 22. The steering assist assembly 24 is operatively connected to the steering column assembly 20 via the steering shaft 42 and is operatively connected to the steering gear assembly 22 via the intermediate shaft 50 and the input shaft 68. In at least one embodiment, the steering assist assembly 24 is directly connected to the steering shaft 42 and the input shaft 68.

The steering assist assembly 24 is configured as an electric assist mechanism that provides torque overlay to aid a driver in steering the vehicle and providing feedback torque to improve feel for a driver of the vehicle. The steering assist assembly 24 applies a torque to the steering shaft 42 to affect the torque that an operator of the vehicle feels through the steering wheel 40. The torque may be a reaction torque applied through an assist mechanism. The steering assist assembly 24 may be directly connected to the steering column 46. In at least one embodiment, the steering assist assembly 24 may be directly connected to the steering gear assembly 22. The steering assist assembly 24 includes an output shaft 150, an assist mechanism 152, and an electric actuator 154.

The output shaft 150 extends from the assist mechanism 152 and is operatively connected to the steering shaft 42, the intermediate shaft 50, and/or the input shaft 68.

The assist mechanism 152 is configured to provide an assist torque or an assist force from the electric actuator 154 to the steering shaft 42, the intermediate shaft 50, and/or the input shaft 68. The assist mechanism 152 may be configured as a worm and a worm gear, a belt driven mechanism, a concentric motor, or any other suitable method connected to the electric actuator 154.

The electric actuator 154 provides a supplemental torque or an assist torque to a torque provided by at least one of the driver to the steering shaft 42 and the steering gear assembly 22 to assist in performing steering maneuvers and/or maneuvers of the advanced features of the power steering system 10.

The sensor assembly 26 includes a pressure sensor assembly 160, a torque sensor 162, and a vehicle sensor 164.

Referring to FIGS. 1-3, the pressure sensor assembly 160 is operatively connected to the steering gear assembly 22.

The pressure sensor assembly 160 is arranged to provide a pressure signal indicative of a fluid pressure of the first cavity 110 and the second cavity 112. The first cavity pressure and the second cavity pressure are provided to the controller 28.

The pressure sensor assembly 160 may be operatively connected to the first port 70 and the second port 72 defined by the rack housing 60. The pressure sensor assembly 160 may be operatively connected to the first port 120 and the second port 122 defined by the valve housing 64, as shown in FIG. 3. The pressure sensor assembly 160 is used to determine the torque to pressure relationship of the valve assembly 66. Measuring in this location minimizes the differences in pressure drop between the two cavities 110, 112 under dynamic conditions. The proximity also allows the sensors to be incorporated into a single package. This eliminates one electrical connection during assembly. It also allows the sensors to be calibrated together, in order to minimize variation between the two sensors.

The pressure sensor assembly 160 is configured as a pressure sensor capable of measuring a differential pressure between the first annular groove 140 and the second annular groove 142. Functionally, the differential pressure between the first and second cavities 110, 112 may be measured. The pressure sensor assembly 160 may be a differential pressure sensor or a dual channel pressure sensor that may be used to monitor or measure a pressure difference between the first cavity 110 and the second cavity 112. The two channels may be integrated into a single sensor or may be two individual pressure sensors in communication with the controller 28.

The pressure sensor assembly 160 may be used by the controller 28 to determine an open loop torque command that is provided to the steering assist assembly 24 for common assist conditions such as variable effort. Variable effort is based on the pressure signal provided by the pressure sensor assembly 160, a torque applied to the steering wheel 40 and/or the steering shaft 42 by the operator of the vehicle, and the vehicle signal provided by the vehicle sensor 164.

Referring to FIGS. 2 and 3, the torque sensor 162 is arranged to provide a torque signal indicative of a steering torque imparted to, or applied to, at least one of the steering wheel 40 and the steering shaft 42 to the controller 28. The torque sensor 162 is disposed proximate the assist mechanism 152 and is disposed about the steering shaft 42 and/or the steering column 46. The torque sensor 162 may be used in conjunction with the pressure sensor assembly 160 or individually by the controller 28 to determine supplemental torque overlay commands such as leads and pulls corrections. In at least one embodiment, the pressure sensor assembly 160 and the torque sensor 162 may be used by the controller 28 to provide closed loop control of the assist level provided by the steering assist assembly 24 based on torque.

Referring to FIGS. 1 and 2, the vehicle sensor 164 is arranged to provide at least one vehicle signal indicative of an operational parameter of the vehicle to the controller 28. The operational parameter may be one or more of a vehicle speed, a steering angle, a steering effort, a brake torque, or the like.

The controller 28 may be a standalone component or may be provided as part of the electric actuator 154 of the steering assist assembly 24. In at least one embodiment, the controller 28 is provided as part of an overall control system or vehicle monitoring system.

The controller 28 is in communication with the pressure sensor assembly 160 and at least one of the torque sensor 162 and the vehicle sensor 164. The controller 28 is provided within input communication channels configured to receive the pressure signal, the torque signal, and the vehicle signal. The controller 28 is provided with output communication channels configured to provide a command, signal, or message to the electric actuator 154.

The controller 28 is provided with control logic executed by at least one processor (e.g., microprocessor) such that the controller 28 is programmed to operate the electric actuator 154 to provide or apply a feedback torque or an assist torque to at least one of the steering shaft 42 and the input shaft 68. The feedback torque, or the assist torque, provided or applied by the electric actuator 154 is based on the differential pressure measured by the pressure sensor assembly 160 and at least one of the input torque measured by the torque sensor 162 and the operational parameter of the vehicle measured by the vehicle sensor 164.

In at least one embodiment, the controller 28 provides a torque overlay command to the electric actuator 154 that determines the amount of assist torque provided by the electric actuator 154 to at least one of the steering shaft 42 and the input shaft 68.

The controller 28 may include a microprocessor or central processing unit (CPU) 28A in communication with various types of computer readable storage devices or media 28B (see FIG. 1). Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 28 in controlling or working in concert with the electric actuator 154 of the steering assist assembly 24, the steering column assembly 20, the steering gear assembly 22, and the sensor assembly 26. In one embodiment, the computer readable storage device(s) may be non-transitory.

Referring to FIG. 2, and in operation of the power steering system 10, torque at the output shaft 150 of the electric steering assist assembly 24 is equal to the sum of the torque provided by the driver at the steering wheel 40, and the toque provided by the electric actuator 154 (e.g., motor) multiplied by an assist mechanical ratio:

$$T_{combined} = T_{driver} + T_{motor}(\text{Ratio})$$

The ratio is the gear ratio for a worm gear or planetary gear and a pulley ratio for a belt drive system. The output torque $T_{combined}$ is the torque applied to the input shaft 68 of the hydraulic steering gear assembly 22. The torque sensor 162 can be used to measure the driver torque $T_{driver}$ and is sent to the controller 28 as a driver torque signal (see arrow 166 in FIG. 2). The assist pressure that is generated in the hydraulic steering gear assembly 22, measured by the pressure sensor assembly 160, and sent to the controller 28 as a pressure signal (see arrow 168 in FIG. 2) is a function of the output torque $T_{combined}$ at the input shaft. The relationship between assist pressure and output torque can be quantified either by an equation 170 executed by the processor 28A of the controller 28, or via a lookup table 172 stored in the storage device 28B. Using the pressure measurement and either the equation(s) 170 or the lookup table(s) 172, a desired torque $T_{desired}$ on the input shaft can be estimated. The equation 170 and use of the lookup table 172 are, or is utilized by, computer instructions executed by the processor 28A. Estimating the desired torque may also include additional inputs, such as fluid temperature and flow rate if measurements or estimates are available.

The relationship between pressure and the desired torque $T_{desired}$ changes for various operating conditions. The desired assist characteristics can be calculated for various operating conditions by using the vehicle sensor(s) 164 to measure the operating conditions and send the data as vehicle condition signals (see arrow 174 in FIG. 2) to the controller 28. The vehicle condition signals 174 are applied by the controller 28 in conjunction with the equation(s) 170 or lookup table(s) 172 to determine the desired torque $T_{desired}$. As one example, it is generally desirable to have low torque at low vehicle speeds, and higher torque at higher vehicle speeds.

The difference between the desired torque $T_{desired}$, and the output torque $T_{combined}$ at the input shaft 68 is applied by the electric actuator 154 of the electric steering assist assembly 24. This can be done by applying an actuator torque command (see arrow 176 in FIG. 2) using either equation(s) 170 or lookup table(s) 172.

Figure 4:
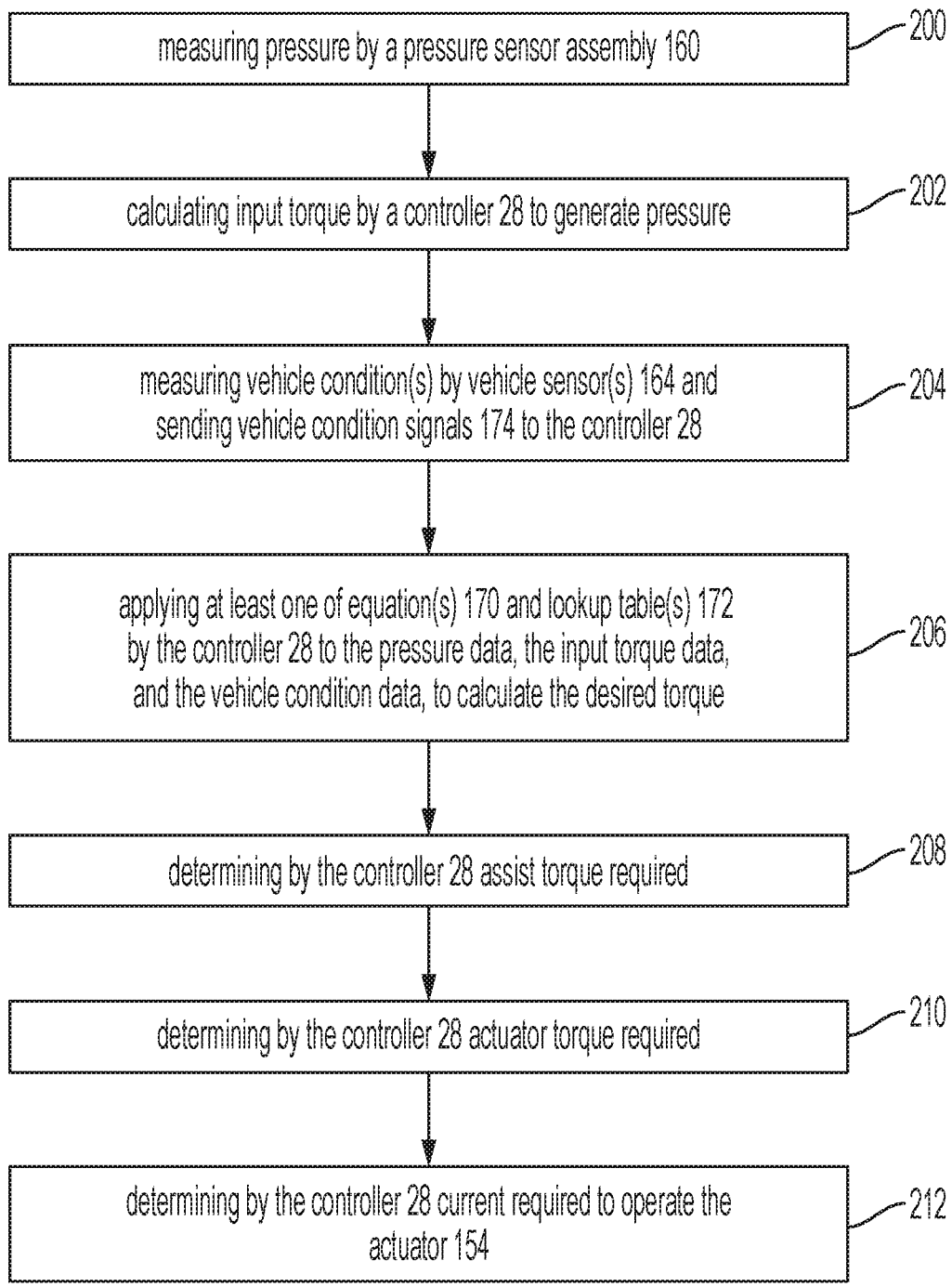
FIG. 4 is a flow chart illustrating a method of operating the power steering system.

Referring to FIG. 4, a method of operating the power steering system 10 includes the steps of measuring the pressure by the pressure sensor assembly 160 at block 200. At block 202, the controller 28 calculates the input torque to generate pressure. At block 204, the vehicle sensor(s) 164 measure vehicle conditions and send vehicle condition signals 174 to the controller 28. At block 206, the controller 28 applies at least one of equation(s) 170 and lookup table(s) 172 to the pressure data, the input torque data, and the vehicle condition data, to calculate the desired torque. At block 208, the controller 28 determines the assist torque required, and represented by:

$$T_{assist} = T_{combined} - T_{desired}$$

At block 210, the controller 28 determines the actuator torque required, and represented by:

$$T_{actuator} = T_{assist}/\text{Ratio}$$

At block 212, the controller 28 determines the current required to operate the actuator 154. The actuator command signal is then sent to the actuator 154. This command signal is indicative of the current.

Figure 5:
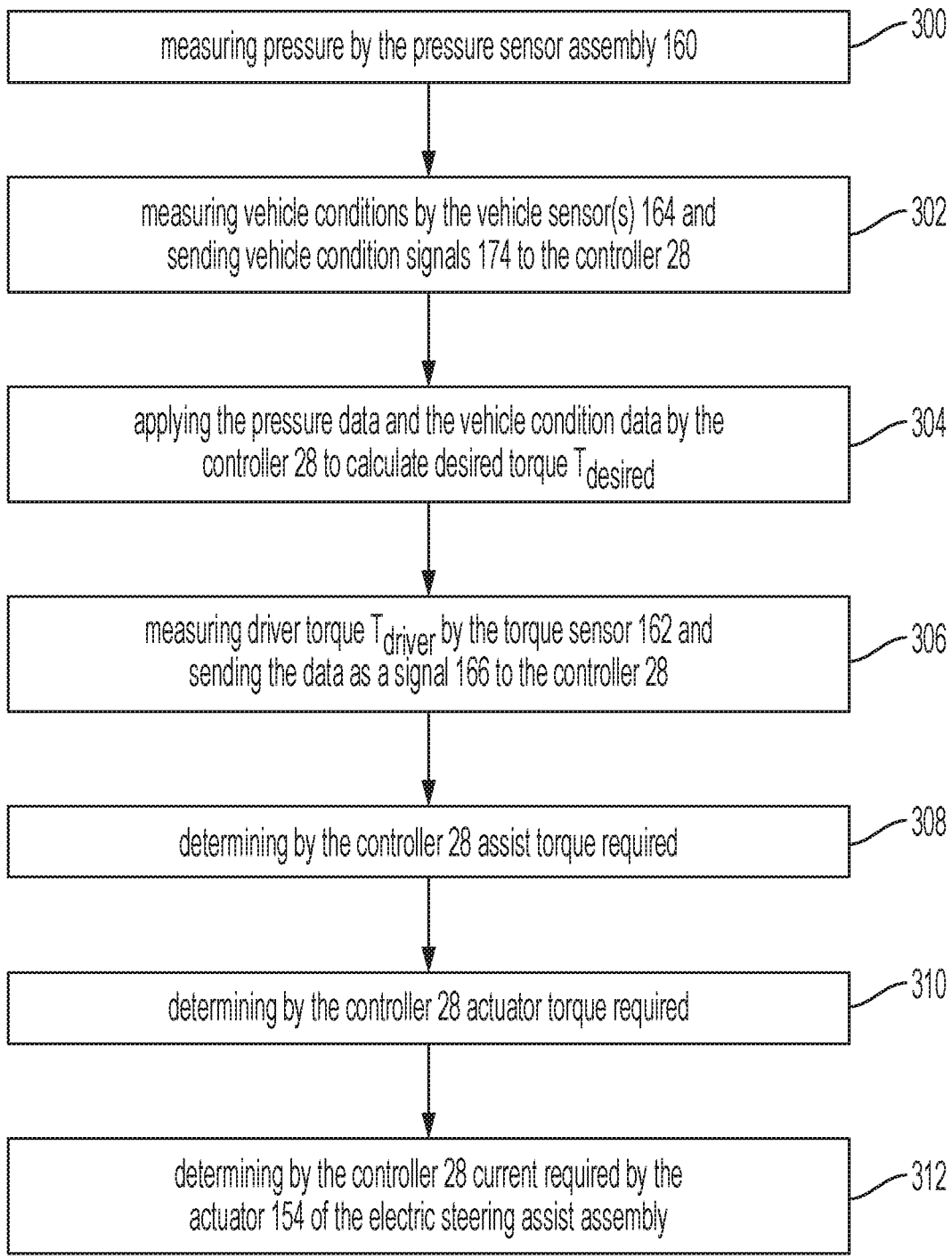
FIG. 5 is a flow chart illustrating a second embodiment of a method of operating the power steering system.

Referring to FIG. 5, and in another embodiment, the torque sensor 162 can be used to measure driver torque $T_{driver}$. The difference between the desired torque $T_{desired}$, and the measured driver torque $T_{driver}$ is applied by the controller 28 to effectuate operation of the actuator 154 of the electric steering assist assembly 24. In this embodiment, the process may begin by the pressure sensor assembly 160 measuring pressure at block 300. At block 302, the vehicle sensor(s) 164 measure vehicle conditions and send vehicle condition signals 174 to the controller 28. At block 304, the controller 28 applies the pressure data and the vehicle condition data to calculate the desired torque $T_{desired}$. At block 306, the torque sensor 162 measures the driver torque $T_{driver}$ and sends the data as a signal 166 to the controller 28.

At block 308, the controller 28 determines the assist torque required, and represented by:

$$T_{assist} = T_{driver} - T_{desired}$$

At block 310, the controller 28 determines the actuator torque required, and represented by:

$$T_{actuator} = T_{assist}/\text{Ratio}$$

At block 312, the controller 28 determines the current required by the actuator 154 of the electric steering assist assembly. The actuator command signal is then sent to the actuator 154. This command signal is indicative of the current.

Either process can be accomplished in a closed loop manner. In a closed loop control, the error between the measured driver torque $T_{driver}$ and the desired torque $T_{desired}$ would be determined by the controller 28. One example of the controller 28 is a PI controller that can be used to control the actuator torque to minimize error instead of using a direct calculation of the torque (see blocks 308 and 310).

In both operating examples, the assist pressure is generated through a relationship of input torque to assist pressure. No external means of controlling pressure, such as external bypass valves, or electric driven pumps is needed. The torque that the driver must apply to achieve a given level of assist pressure is changed by providing a supplemental torque by the actuator 154. In the embodiments described herein, the pressure is generated using a conventional hydraulic steering system. The pump is driven by the vehicle engine and provides a hydraulic flow rate to the steering gear based on the engine speed. The pressure generated in the gear is determined by the torque applied to the input shaft of the gear. In order to change the pressure generated, the torque applied to the gear must be changed.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the invention, it is claimed:

1. A method of assisting a steering effort in a hydraulic steering system comprising:
   measuring a pressure with a pressure sensor assembly;
   calculating an input torque with a controller;
   measuring at least one vehicle condition with at least one vehicle sensor and sending a vehicle condition signal to the controller;
   determining a current required to operate an actuator with the controller; and
   determining an assist torque required with the controller, wherein the assist torque is determined by subtracting a desired torque from a combined torque provided by a driver and a motor.

2. The method of claim 1, further comprising determining an actuator torque required with the controller.

3. The method of claim 1, wherein the pressure is measured with a dual pressure sensor.

4. A method of assisting a steering effort in a hydraulic steering system comprising:
   measuring a pressure with a pressure sensor assembly;
   calculating an input torque with a controller;
   measuring at least one vehicle condition with at least one vehicle sensor and sending a vehicle condition signal to the controller;
   determining a current required to operate an actuator with the controller; and
   determining an actuator torque required with the controller, wherein the actuator torque is determined by dividing a combined torque provided by a driver and a motor by a mechanical assist ratio.

5. The method of claim 4, wherein the mechanical assist ratio is a gear ratio.

6. The method of claim 4, wherein the mechanical assist ratio is a pulley ratio.

7. The method of claim 4, wherein the pressure is measured with a dual pressure sensor.

8. A method of assisting a steering effort in a hydraulic steering system comprising:
   measuring a pressure with a pressure sensor assembly;
   measuring at least one vehicle condition with at least one vehicle sensor and sending a vehicle condition signal to a controller;
   measuring a driver torque with a torque sensor and sending the data as a signal to the controller;
   determining a current required to operate an actuator of an electric steering assist assembly with the controller; and
   determining an assist torque required with the controller, wherein the assist torque is determined by subtracting a desired torque from a combined torque provided by a driver and a motor.

9. The method of claim 8, wherein the pressure is measured with a dual pressure sensor.

10. A method of assisting a steering effort in a hydraulic steering system comprising:
    measuring a pressure with a pressure sensor assembly;
    measuring at least one vehicle condition with at least one vehicle sensor and sending a vehicle condition signal to a controller;
    measuring a driver torque with a torque sensor and sending the data as a signal to the controller;
    determining a current required to operate an actuator of an electric steering assist assembly with the controller; and
    determining an actuator torque required with the controller, wherein the actuator torque is determined by dividing a combined torque provided by a driver and a motor by a mechanical assist ratio.

11. The method of claim 10, wherein the pressure is measured with a dual pressure sensor.

12. A method of assisting a steering effort in a hydraulic steering system comprising:
    measuring a pressure with a pressure sensor assembly;
    measuring at least one vehicle condition with at least one vehicle sensor and sending a vehicle condition signal to a controller;
    measuring a driver torque with a torque sensor and sending the data as a signal to the controller;
    determining a current required to operate an actuator of an electric steering assist assembly with the controller; and
    determining an actuator torque required with the controller, wherein the mechanical assist ratio is a gear ratio.

13. The method of claim 12, wherein the pressure is measured with a dual pressure sensor.

14. A method of assisting a steering effort in a hydraulic steering system comprising:
    measuring a pressure with a pressure sensor assembly;
    measuring at least one vehicle condition with at least one vehicle sensor and sending a vehicle condition signal to a controller;
    measuring a driver torque with a torque sensor and sending the data as a signal to the controller;
    determining a current required to operate an actuator of an electric steering assist assembly with the controller; and
    determining an actuator torque required with the controller, wherein the mechanical assist ratio is a pulley ratio.

15. The method of claim 14, wherein the pressure is measured with a dual pressure sensor.

* * * * *